United States Patent [19]

Miyawaki et al.

[11] Patent Number: 4,856,861
[45] Date of Patent: Aug. 15, 1989

[54] LIGHT WAVEGUIDE LENS

[75] Inventors: Mamoru Miyawaki; Shigetaro Ogura, both of Tokyo; Kazuya Matsumoto, Yokohama, all of Japan

[73] Assignee: Canon Kabushiki Kaisha, Tokyo, Japan

[21] Appl. No.: 58,603

[22] Filed: Jun. 4, 1987

Related U.S. Application Data

[63] Continuation of Ser. No. 635,518, Jul. 30, 1984, abandoned.

[30] Foreign Application Priority Data

Aug. 3, 1983 [JP] Japan ................................. 58-142211
Aug. 4, 1983 [JP] Japan ................................. 58-142956

[51] Int. Cl.$^4$ ............................................. G02B 6/10
[52] U.S. Cl. ............................... 350/96.14; 350/96.13
[58] Field of Search ............... 350/96.14, 96.18, 96.11, 350/96.13

[56] References Cited

U.S. PATENT DOCUMENTS

| | | | |
|---|---|---|---|
| 3,614,198 | 10/1971 | Martin et al. | 350/96.18 |
| 3,954,323 | 5/1976 | Andrews et al. | 350/96.18 |
| 4,025,157 | 5/1977 | Martin | 350/96.18 |
| 4,057,321 | 11/1977 | Mahlein et al. | 350/96.14 |
| 4,139,259 | 2/1979 | Kersten et al. | 350/96.13 |
| 4,184,738 | 1/1980 | Wright | 350/96.14 |
| 4,294,507 | 10/1981 | Johnson | 350/96.18 |
| 4,369,202 | 1/1983 | Verber et al. | 427/8 |
| 4,400,053 | 8/1983 | Kazkaz | 350/96.21 |
| 4,425,023 | 1/1984 | Matsumoto et al. | 350/96.14 |

OTHER PUBLICATIONS

*Journal of the Optical Society of America,* R. Shubert and J. H. Harris, Feb. 1971, "Optical Guided-Wave Focusing and Diffraction", vol. 61, No. 2.
i IEEE Journal of Quantum Electronics, J. T. Boyd and Dean B. Anderson, Jun. 1978, "Effect of Waveguide Optical Scattering on the Intergrated Optical Spectrum Analyzer Dynamic Range", Vol. OE-14, No. 6.
R. K. Luneburg: *Mathematical Theroy of Optics* (University of California, Berkeley, 1966) p. 182.
J. Brown: Lens Antennas, Antenna Theory Part 2, Ed. R. E. Collins and F. J. Zucker (McGraw-Hill, New York 1969) p. 131.

*Primary Examiner*—William L. Sikes
*Assistant Examiner*—Robert E. Wise
*Attorney, Agent, or Firm*—Fitzpatrick, Cella, Harper & Scinto

[57] ABSTRACT

In a light waveguide lens comprises a light waveguide and a lens portion provided in a portion of the light waveguide, the refractive index of the light waveguide and/or the lens portion is variable to vary the focal length of the lens portion, thereby causing the waveguide light to be accurately converged at a predetermined position.

8 Claims, 2 Drawing Sheets

LIGHT WAVEGUIDE LENS

This application is a continuation of application Ser. No. 635,518, filed July 30, 1984, now abandoned.

BACKGROUND OF THE INVENTION

1. Field of the Invention

This invention relates to a light waveguide lens for use in an integrated optical structure.

2. Description of the Prior Art

As light waveguide lenses, there are known Luneburg lens [R. K. Luneburg: *Mathematical Theory of Optics* (Univ. of California, Berkeley, 1966) P. 182] in which a mound-like overlay is formed on a light waveguide and the effective refractive index distribution of the light waveguide is endowed with a variation to thereby converge the waveguide light, a geodesic lens [J. Brown: *Lens Antennas, Antenna Theory* Part 2, ed. R. E. Collin and F. J. Zucker (McGrow-Hill, New York 1969) P. 131] in which a light waveguide is formed on a substrate having a concave portion and the optical path length of the waveguide light is endowed with a variation to thereby cause a converging action to be created, and Fresnel lens [R. Shubert and J. H. Harris: *J. Opt. Soc. Am* 61 (1971) P. 154] in which the waveguide light is converged by the diffracting action of light. These light waveguide lenses are used as a collimater lens, a Fourier conversion lens [J. T. Boyd and D. B. Anderson: *IEEE J, Quantum Electron QE*-14 (1978) P. 437] or a condensing lens [Matsumoto, Yamaguchi, Tsuji and Sato: Japanese Laid-open Patent Application No. 111837/1981]. Particularly, where they are used as the Fourier conversion lens or the condensing lens, it is required that the on-axis and off-axis waveguide lights be accurately imaged at a predetermined position However, in the case of the Luneburg lens, the production accuracy of the refractive index of the overlay formed on the light waveguide is of the order of ±0.005 at highest, and this has led to a problem that the focal length differs between products due to the error of the refractive power of each rod made. Also, in other light waveguide lenses such as the geodesic lens and the like, it has been difficult from the viewpoint of the production accuracy to obtain an accurate focal length.

Where the integrated optical structure is used as the head or the like of an optical information processing apparatus, it is necessary to accurately converge light on a fluctuating object surface, and realization of a light waveguide lens which can follow the fluctuation to vary the focal length has been desired.

SUMMARY OF THE INVENTION

It is an object of the present invention to provide a light waveguide lens for accurately converging waveguide light at a predetermined position.

It is another object of the present invention to provide a light waveguide lens having a variable focal length.

The present invention achieves the above objects by a light waveguide lens comprising a light waveguide, a lens portion provided in a portion of the light waveguide, and means for varying the refractive index of the light waveguide and/or the lens portion and varying the focal length of the lens portion.

The invention will become fully apparent from the following detailed description thereof taken in conjunction with the accompanying drawings.

DESCRIPTION OF THE PREFERRED EMBODIMENTS

Figure 1:
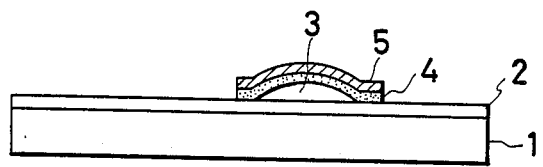
FIG. 1 is a schematic cross-sectional view showing a first embodiment of the present invention using a thermo-optic effect.

Referring to FIG. 1 which is a schematic cross-sectional view showing a first embodiment of the present invention, reference numeral 1 designates a substrate, reference numeral 2 denotes a light waveguide, reference numeral 3 designates an overlay, reference numeral 4 denotes a buffer layer, and reference numeral 5 designates a heating electrode. y-cut $LiNbO_3$ crystal is used as the substrate 1, and the light waveguide 2 was formed by heat-diffusing Ti on the y-cut surface. Next, $Nb_2O_5$ was RF-sputtered into the form of a dome on the optical waveguide 2 by the use of a mask having a frusto-conical opening to thereby form the overlay 3. The refractive index of this $Nb_2O_5$ film exhibits 2.24–2.26 which is a value higher than the refractive index of the Ti-diffused $LiNbO_3$ crystal and therefore, the light propagated through the light waveguide 2 is introduced into the overlay 3 at a lens portion on which the overlay is formed, and is subjected to a converging action. The buffer layer 4 was provided on this overlay 3 and further, $HFB_2$ was deposited by evaporation as the heating electrode 5. The buffer layer 4 is formed, for example, by deposition of $SiO_2$, and has a refractive index lower than that of the overlay and prevents the absorption of light into the heating electrode 5. Accordingly, the buffer layer 4 need not always be provided if the heating electrode 5 is low in light absorption and has a refractive index lower than that of the overlay.

In the light waveguide lens of the above described construction, when a current flows to the heating electrode 5 to heat the overlay 3, the refractive index of the overlay 3 is varied by a thermo-optic effect and the focal length of the lens portion can be varied. Accordingly, by constructing the light waveguide lens as in the present embodiment and controlling the voltage applied to the heating electrode, the waveguide light can be accurately converged at a predetermined position and the error of the focal length during the manufacture of the lens can be corrected.

Also, when the heating electrode 5 is driven by a modulation signal, the focal length is varied in conformity with the modulation signal. Accordingly, for example, by using this light waveguide lens for the optical head of an optical information processing apparatus and driving the heating electrode in accordance with a focus error signal, there can be constructed an autofocus system having no mechanical movable portion.

Figure 2:
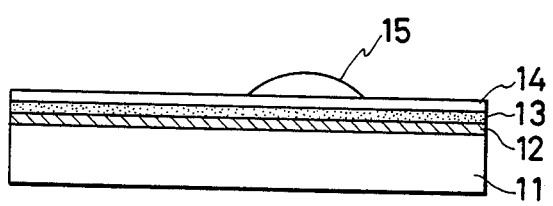
FIG. 2 is a schematic cross-sectional view showing a second embodiment using a thermo-optic effect.

Referring now to FIG. 2 which is a schematic cross-sectional view showing a second embodiment of the present invention, reference numeral 11 designates a substrate, reference numeral 12 denotes a heating electrode, reference numeral 13 designates a buffer layer, reference numeral 14 denotes a light waveguide, and reference numeral 15 designates an overlay. Si is used as the substrate 11, an $HFB_2$ film was deposited by evaporation as the heating electrode 12, and an $SiO_2$ film was deposited by evaporation as the buffer layer 13 on the electrode 12. The buffer layer 13 prevents the absorption of light into the electrode 12 and is provided to widen the possibility of choosing the material of the light waveguide 14 by using a film of low refractive index for the buffer layer. Accordingly, the buffer layer 13 need not always be provided if the electrode 12 is low in light absorption and is lower in refractive index than the light waveguide 14.

Further, a thin glass film (trade name: Corning 7059, produced by Corning, Inc.) was deposited by evaporation as the light waveguide 14 on the buffer layer 13. When the propagation loss of this light waveguide 14 was measured, a low loss value of 0.5 dB/cm was obtained. Next, ZnO was RF-sputtered into the form of a dome on the light waveguide 14 by the use of a mask having a frusto-conical opening to thereby form the overlay 15.

In the present embodiment, the light waveguide 14 is heated by the heating electrode 12 to vary the refractive index of the light waveguide, thereby varying the focal length of the lens portion on which the overlay is formed. Accordingly, again in the present embodiment, an effect entirely similar to that of the first embodiment can be obtained by controlling the temperature of the light waveguide 14 by the use of the heating electrode 12. Also, the present embodiment is of the planar type electrode structure and therefore can be manufactured much more easily than the first embodiment.

Description has been made with the Luneburg lens taken as an example, and in the lens of this type, a variation in the focal length thereof occurs if the refractive indices of the light waveguide and the overlay vary relative to each other. Accordingly, as in the first and second embodiments, the temperature of one of the light waveguide and the overlay may be varied or, even if the temperatures of both of the light waveguide and the overlay are varied, the focal length of the lens portion can be varied because the degrees of variation in refractive index of the light waveguide and the overlay differ from each other. The means for varying the temperature is not restricted to the heating electrode, but use may also be made of a thermo-electric conversion element which effects heating or cooling.

The light waveguide lens of the above-described embodiment uses the thermo-optic effect, and this leads to a problem that it is poor in its responsiveness to a high-speed change of the focal length. In this case, such problem can be considerably overcome as by providing a heat sink in the substrate or the lens portion and making the input to the temperature control means such as the heating electrode into a pulse-like signal. It is particularly desirable that the heat sink be provided with a readily controllable cooling means such as a Peltier element or the like.

The above-described embodiment is applicable not only to a Luneburg lens but also to other light waveguide lenses. For example, in a geodesic lens, the lens portion is formed by a variation in the shape of the light waveguide, but again in this case, the refractive index of the light waveguide can be varied to vary the focal length of the lens portion.

Figure 3:
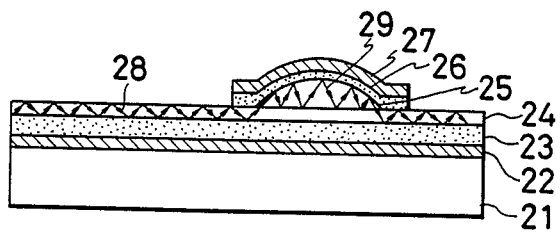
FIG. 3 is a schematic cross-sectional view showing a third embodiment using an electro-optic effect.

FIG. 3 is a schematic cross-sectional view showing a third embodiment of the present invention which uses the electro-optic effect for the means for varying the refractive index. In FIG. 3, reference numeral 21 designates a substrate, reference numerals 22 and 27 denote electrodes, reference numerals 23 and 26 designate buffer layers, reference numeral 24 denote a light waveguide, and reference numeral 25 designates an overlay. Si is used as the substrate 21, and an $In_2O_3/SnO_2$ (ITO) film was made as the electrode 22 by a magnetron type sputtering apparatus. Further, an $SiO_2$ film was deposited by evaporation as the buffer layer 23 on the electrode 22. The buffer layer 23 prevents the absorption of light into the electrode 22 and is provided to widen the possibility of choosing the material of the light waveguide 24 by using a film of low refractive index for the buffer layer. Accordingly, if the electrodes 22 and 27 are lot in light absorption and are lower in refractive index than the light waveguide 24 and the overlay 25, the buffer layers 23 and 26 need not always be provided. A thin glass film (trade name: Corning 7059, produced by Corning, Inc.) was deposited by evaporation as the light waveguide 24 on the buffer layer 23. When the propagation loss of the light waveguide 24 was measured, a low loss value of 0.5 dB/cm was obtained.

Next, ZnO was RF-sputtered into the form of a dome on the light waveguide 24 by the use of a mask having a frusto-conical opening to make the overlay 25. As a result of the measurement of the crystal azimuth of the ZnO film effected by the use of electron diffraction and X-ray diffraction, it could be confirmed that the ZnO film was C-axis-oriented. Further, the buffer layer 26 and electrode 27 were provided on the overlay 25 by the same method as the method of making the buffer layer 23 and electrode 22. The refractive index of $SiO_2$ of the buffer layer 23 is 1.47 and the refractive index of Corning 7059 which forms the light waveguide 24 is 1.57 and therefore, for example, the waveguide light 28 directed by a conventional prism coupler (not shown) propagates through the light waveguide 24 while repeating total reflection. On the other hand, the refractive index of ZnO of the overlay 25 is 2.0 which is higher than the refractive index of the light waveguide 25 and therefore, the waveguide light 28 in the light waveguide is introduced into the overlay at the lens portion in which this overlay is formed, and propagates through the overlay 25 as does the waveguide light 29.

When a voltage is applied from a voltage source, not shown, between the electrode 22 and 27, an electric field is produced between these electrodes and the refractive index of the overlay formed of ZnO is varied by the electro-optic effect, whereby the focal length of the lens portion can be varied. Accordingly, by constructing the light waveguide lens as in the present embodiment and controlling the electric field between the electrodes, the waveguide light can be accurately converged at a predetermined position and the error of the focal length during the manufacture of the lens can be corrected.

Also, by a modulated signal being applied to between the electrodes, the focal length is varied rapidly in conformity with the modulated signal. Accordingly, by using this light waveguide lens, for example, in the optical head of an optical information processing apparatus and applying a voltage in accordance with the focus error signal between the electrodes, there can be constructed an auto-focus system of good responsiveness.

In the present embodiment, the space between the electrodes is a very thin film usually of several μm and therefore, a great electric field is produced by a very low applied voltage, and this leads to an advantage that a great electro-optic effect is obtained.

In the present embodiment, a thin glass film (Corning 7059) is used as the light waveguide and a thin film of ZnO is used as the overlay, but to obtain a greater electro-optic effect, a thin film of $Al_2O_3$ may be used as the light waveguide and a thin film of PLZT[(Pb,La)(Zr,Ti)$O_3$] may be used as the overlay.

Figure 4:
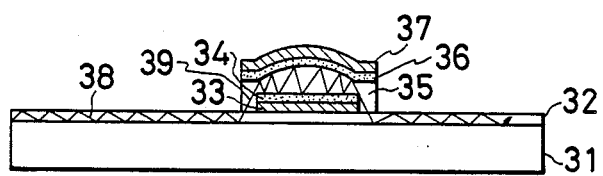
FIG. 4 is a schematic cross-section view showing a fourth embodiment using an electro-optic effect.

A fourth embodiment of the present invention will now be described by reference to FIG. 4. In FIG. 4, reference numeral 31 designates a substrate, reference numeral 32 denotes a light waveguide, reference numeral 33 and 37 designate electrodes, reference numerals 34 and 36 denote buffer layers, and reference numeral 35 designates an overlay. Y-cut $LiNbO_3$ crystal is used as the substrate 31, and the light waveguide 32 was formed by heat-diffusing Ti on the y-cut surface. Next, resist of a pattern having an aperture of a size similar to that of the overlay is formed on the light waveguide 32 at a location whereat the overlay is to be formed, and a film of Al as the electrode 33 and a film of ZnO as the buffer layer 34 are deposited by evaporation. The resist is removed by the lift-off method and, as shown in FIG. 4, the electrode 33 and the buffer layer 34 are formed. To form the overlay 35, a mask having a frusto-conical opening portion for forming the overlay was placed on the electrode 33 and the buffer layer 34, and a thin film of PLZT[(Pb,La)(Zr,Ti)$O_3$] was epitaxially grown into the form of a dome to provide the overlay 35. Since the film of ZnO is C-axis-oriented, the grown surface of the thin film of PLZT is 1, 1, 1 at the mirror index and a great electro-optic effect is obtained. Further, a film of $SiO_2$ as the buffer layer 36 and a film of Al as the electrode 37 were formed on the overlay 35. The waveguide light 38 propagated through the light waveguide 32 is introduced toward the overlay 35 at the lens portion in which the overlay 35 is formed, as indicated by the waveguide light 39, and is propagated between the buffer layers 34 and 36.

Again in the present embodiment, by applying a voltage to between the electrodes 33 and 37, there can be obtained entirely the same effect as that of the third embodiment. Further, the present embodiment has an effect that the distance between the electrodes 33 and 37 is small as compared with the third embodiment and to obtain the same electric field, a smaller applied voltage is required. Also, where the light waveguide is formed by diffusing ions or the like on the surface of a crystal substrate, it is impossible to form an electrode between the substrate and the light waveguide as in the third embodiment, but if the structure of the present embodiment is used, the light waveguide lens of the present invention can be made in any type of light waveguide.

Figure 5:
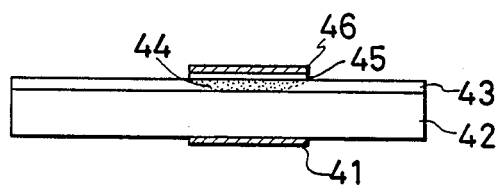
FIG. 5 is a schematic cross-sectional view showing a fifth embodiment using an electro-optic effect.

A fifth embodiment of the present invention will now be described by reference to FIG. 5. In FIG. 5, reference numerals 41 and 46 designate Al electrodes, reference numeral 42 denotes an $LiTaO_3$ crystal substrate, reference numeral 43 designates an $LiNb_xTa_{1-x}O_3$ light waveguide, reference numeral 44 denotes a lens portion formed of $LiNb_yTa_{1-y}O_3$, and reference numeral 45 designates an $SiO_2$ buffer layer.

A method of making the fifth embodiment will hereinafter be described. The $LiNb_xTa_{1-x}O_3$ light waveguide 43 epitaxially grown by the liquid phase or gaseous phase growing method is formed on the $LiTaO_3$ substrate 42 having a polished surface. Then, a film of Nb is formed into the form of a mound by the use of a shadow mask, and the film of Nb is diffused at 1100° C. By this heat treatment, Nb is diffused in the interior of the $LiNb_xTa_{1-x}O_3$ and the composition ratio of Nb is increased, whereby there is created a refractive index distribution having the action of a lens formed of $LiNb_yTa_{1-y}O_3(y>x)$. The buffer layer 45 is attached to the thus formed lens portion 44, and further, the Al electrodes 41 and 46 are formed on the back of the substrate and the buffer layer 45, respectively.

Again in the present embodiment, by applying an electric field between the electrodes 41 and 46 and by the electro-optic effect, the refractive index of the lens portion 44 can be varied to vary the focal length thereof. The Al electrode 41 may be formed on the whole back surface of the substrate, but in order that the electric field may be efficiently applied to the lens portion, it is desirable that the Al electrode 41 be formed only on the underside of the lens portion as in the present embodiment.

Figure 6:
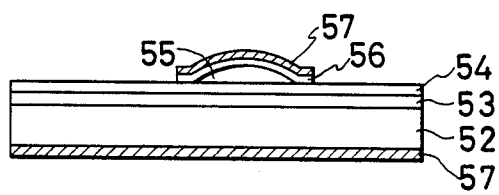
FIG. 6 is a schematic cross-section view showing a sixth embodiment using an electro-optic effect.

A sixth embodiment of the present invention will now be described by reference to FIG. 6. In FIG. 6, reference numerals 51 and 57 designate electrodes, reference numeral 52 denotes an n+-GaAs substrate (having a thickness of 200 μm), reference numeral 53 designates an n+-$Al_xGa_{1-x}As$ (x=0.06) buffer layer, reference numeral 54 denotes an n-$Al_yGa_{1-y}As$ (y=0.03) light waveguide, reference numeral 55 designates an n-GaAs overlay, and reference numeral 56 denotes a p+-$Al_zGa_{1-z}As$(z=0.06) buffer layer. When a reverse voltage is applied to the pn junction type double hetero structure, a void layer is created in the overlay 55 and the refractive index is increased by the electro-optic effect. Accordingly, by the utilization of this variation in the refractive index, the focal length can be varied as in the previously described embodiment. In this sixth embodiment, the buffer layer 53 is formed on the GaAs substrate and not only can be formed monolithically with a laser light source or a modulator, but also GaAs has a great electro-optic effect, and this leads to an advantage that the adjustment range of the focus position is wide.

In the previously described embodiment, the refractive index of the lens portion has been varied, whereas not the lens portion but the light waveguide may be formed of a substance having an electro-optic effect and the refractive index of this light waveguide may be varied so that the focal length of the lens portion may be varied. Also, if a relative variation in refractive index is created by the application of an electric field, both the light waveguide and the lens portion may be formed of a substance having an electro-optic effect.

Further, the construction utilizing the electro-optic effect is applicable not only to the lens as previously described, but also to various light waveguide lenses. For example, in a geodesic lens, the lens portion is formed by the variation in shape of the light waveguide, but again in this case, the light waveguide may be formed on a substance having an electro-optic effect and an electric field may be applied to this waveguide to thereby vary the focal length of the lens portion.

Further, the present invention is not limited to the above-described embodiments, but permits other various modifications to be made without departing from the scope of the invention as defined in the appended claims.

What we claim is:

1. A light waveguide lens comprising:
   a light waveguide;
   a lens portion provided in a portion of said light waveguide, said lens portion having a finite focal distance; and
   a thermoelectric converting element provided in proximity of at least one of said light waveguide and said lens portion, said converting element reversibly varying the refractive index of at least one of said light waveguide and said lens portion by varying the temperature thereof and thereby reversibly varying the focal length of said lens portion.

2. A light waveguide lens according to claim I, wherein said thermoelectric converting element comprises a heating electrode.

3. A light waveguide lens according to claim 2, wherein a buffer layer for preventing the absorption of waveguide light by said heating electrode is provided between said heating electrode and said at least one of said light waveguide and said lens portion.

4. A light waveguide lens according to claim 2, wherein said lens portion has an overlay provided on said light waveguide, and said heating electrode is formed on said overlay.

5. A light waveguide lens according to claim 2, wherein said heating electrode is provided on a substrate, and said light waveguide is formed on said heating electrode.

6. A light waveguide lens according to claim 5, wherein said heating electrode is formed of a film of $HFB_2$.

7. A light waveguide lens comprising:
   a light waveguide;
   a lens portion composed of an overlay made of electro-optic material having a higher refractive index than that of said light waveguide and formed on a part of said light waveguide;
   a first electrode provided between said light waveguide and said overlay;
   a second electrode provided on said overlay; and
   means for reversibly varying the refractive index of said overlay by generating an electric field between said first and second electrodes to reversibly vary the focal length of said lens portion.

8. A light waveguide lens according to claim 7, wherein buffer layers are respectively provided between said overlay and said first electrode and between said overlay and said second electrode, said buffer layers having a lower refractive index than that of said overlay.

* * * * *